(12) United States Patent
Gokhale

(10) Patent No.: US 9,928,303 B2
(45) Date of Patent: Mar. 27, 2018

(54) MERGING DATA ANALYSIS PATHS

(71) Applicant: International Business Machines Corporation, Armonk, NY (US)

(72) Inventor: Parag S. Gokhale, Pune (IN)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 14/684,827

(22) Filed: Apr. 13, 2015

(65) Prior Publication Data

US 2016/0132603 A1    May 12, 2016

Related U.S. Application Data

(63) Continuation of application No. 14/537,118, filed on Nov. 10, 2014.

(51) Int. Cl.
*G06F 17/30* (2006.01)
*G06Q 30/00* (2012.01)

(52) U.S. Cl.
CPC .... *G06F 17/30876* (2013.01); *G06F 17/3097* (2013.01); *G06F 17/30867* (2013.01); *G06Q 30/00* (2013.01)

(58) Field of Classification Search
CPC ........... G06F 17/30867; G06F 17/3097
USPC ....... 707/722, 723, 728, 709, 718, 735, 741, 707/649, 654, 714, 727, 732, 738, 739, 707/742, 748, 749, 754, 760, 770, 771, 707/779, 809; 726/23, 12; 705/3, 14.53, 705/14.54, 14.55, 44, 7.12, 7.29, 7.35, 705/7.39
See application file for complete search history.

(56) References Cited

U.S. PATENT DOCUMENTS

| | | | | |
|---|---|---|---|---|
| 7,137,065 | B1 * | 11/2006 | Huang | G06F 17/30722 707/999.003 |
| 7,836,089 | B2 * | 11/2010 | Ryman | G06F 17/30 707/796 |
| 2008/0154919 | A1 * | 6/2008 | Barlen | G06F 21/552 |
| 2008/0281817 | A1 * | 11/2008 | White | G06F 17/30867 |
| 2010/0145902 | A1 * | 6/2010 | Boyan | G06F 17/3089 706/54 |
| 2012/0117089 | A1 | 5/2012 | Matrat et al. | |
| 2015/0088911 | A1 * | 3/2015 | Qiao | G06F 17/30867 707/749 |

OTHER PUBLICATIONS

Appendix P, List of IBM Patents or Patent Applications Treated As Related, Filed Apr. 13, 2015.
(Continued)

*Primary Examiner* — Jay Morrison
*Assistant Examiner* — Ken Hoang
(74) *Attorney, Agent, or Firm* — Scully, Scott, Murphy & Presser, P.C.; Erik Johnson

(57) ABSTRACT

Merging analysis paths is provided. A first analysis path and a second analysis path are identified, wherein each analysis path identifies one or more data resources of an information space. A match is determined between a first data resource of the one or more data resources identified by the first analysis path and a second data resource of the one or more data resources identified by the second analysis path. A third analysis path that is based, at least in part, on the first analysis path and the second analysis path is generated.

10 Claims, 4 Drawing Sheets

(56) References Cited

OTHER PUBLICATIONS

"An Analytics Platform that is Incredibly Easy to Use", Business Intelligence and Analytics Platform, Yellowfin International Pty Ltd., printed May 8, 2014, Copyright © 2003-2013 Yellowfin International Pty Ltd., pp. 1-13, <http://www.yellowfinbi.conn/YFWebsite-Business-Intelligence-and-Analytics-Platform-24427#collaboration>.

"Dashboards that Show you all your Data Combined", Copyright 2014 SiSense Inc., provided in search report dated May 8, 2014, pp. 1-14, <http://www.sisense.com/features/>.

"Merging Data Analysis Paths", U.S. Appl. No. 14/537,118, pp. 1-26, filed Nov. 10, 2014.

* cited by examiner

MERGING DATA ANALYSIS PATHS

BACKGROUND OF THE INVENTION

The present invention relates generally to the field of data analysis and, more particularly, to merging data resources based on shared information. A data resource may, for example, be a web document, image, video, chart, graph, spreadsheet, or other piece of content or collection of content.

Business analytics refers to the skills, technologies and practices for investigating past business performance to gain useful business data and improve business planning. Business analytics make extensive use of data, statistical and quantitative analysis, explanatory and predicative modeling, and fact-based management in order to make decisions and conclusions. In business, several people with varying areas of expertise and objectives may navigate the same information space, such as the internet or World Wide Web, but come to separate conclusions.

SUMMARY

According to one embodiment of the present disclosure, a method for merging analysis paths is provided. The method includes identifying, by one or more processors, a first analysis path and a second analysis path, wherein each analysis path identifies one or more data resources of an information space; determining, by one or more processors, that a first data resource of the one or more data resources identified by the first analysis path matches a second data resource of the one or more data resources identified by the second analysis path; and generating, by one of more processors, a third analysis path that is based, at least in part, on the first analysis path and the second analysis path.

According to another embodiment of the present disclosure, a computer program product for merging analysis paths is provided. The computer program product comprises a computer readable storage medium and program instructions stored on the computer readable storage medium. The program instructions include program instructions to identify a first analysis path and a second analysis path, wherein each analysis path identifies one or more data resources of an information space; program instructions to determine that a first data resource of the one or more data resources identified by the first analysis path matches a second data resource of the one or more data resources identified by the second analysis path; and program instructions to generate a third analysis path that is based, at least in part, on the first analysis path and the second analysis path.

According to another embodiment of the present disclosure, a computer system for merging analysis paths is provided. The computer system includes one or more computer processors, one or more computer readable storage media, and program instructions stored on the computer readable storage media for execution by at least one of the one or more processors. The program instructions include program instructions to identify a first analysis path and a second analysis path, wherein each analysis path identifies one or more data resources of an information space; program instructions to determine that a first data resource of the one or more data resources identified by the first analysis path matches a second data resource of the one or more data resources identified by the second analysis path; and program instructions to generate a third analysis path that is based, at least in part, on the first analysis path and the second analysis path.

DETAILED DESCRIPTION

Data collaboration in business analytics can lead to an extensive collection of information, data resources, and different conclusions without a meaningful way to merge, connect, or relate the information. Collaboration is defined as at least two individuals working together to achieve a goal or complete a task. Data collaboration is collaboration relying on pieces of information to achieve a goal or complete a task. This information relied upon can be generally referred to as a data resource. A data resource may, for example, be a web document, image, video, chart, graph, spreadsheet, or other piece of content or collection of content. Data resources are often found through the navigation of an information space, such as the internet or World Wide Web. As data is collected it may become difficult to sort through and determine which data resources are connected. Embodiments of the present invention use metadata, or information about the data (e.g., that it is a spreadsheet about sales, or a web page about cars) and provide a mechanism to merge data resources using the data resources metadata. The mechanism to merge data resources allows collaborators to better analyze the data resources and draw conclusions from a large collections of information.

Figure 1:
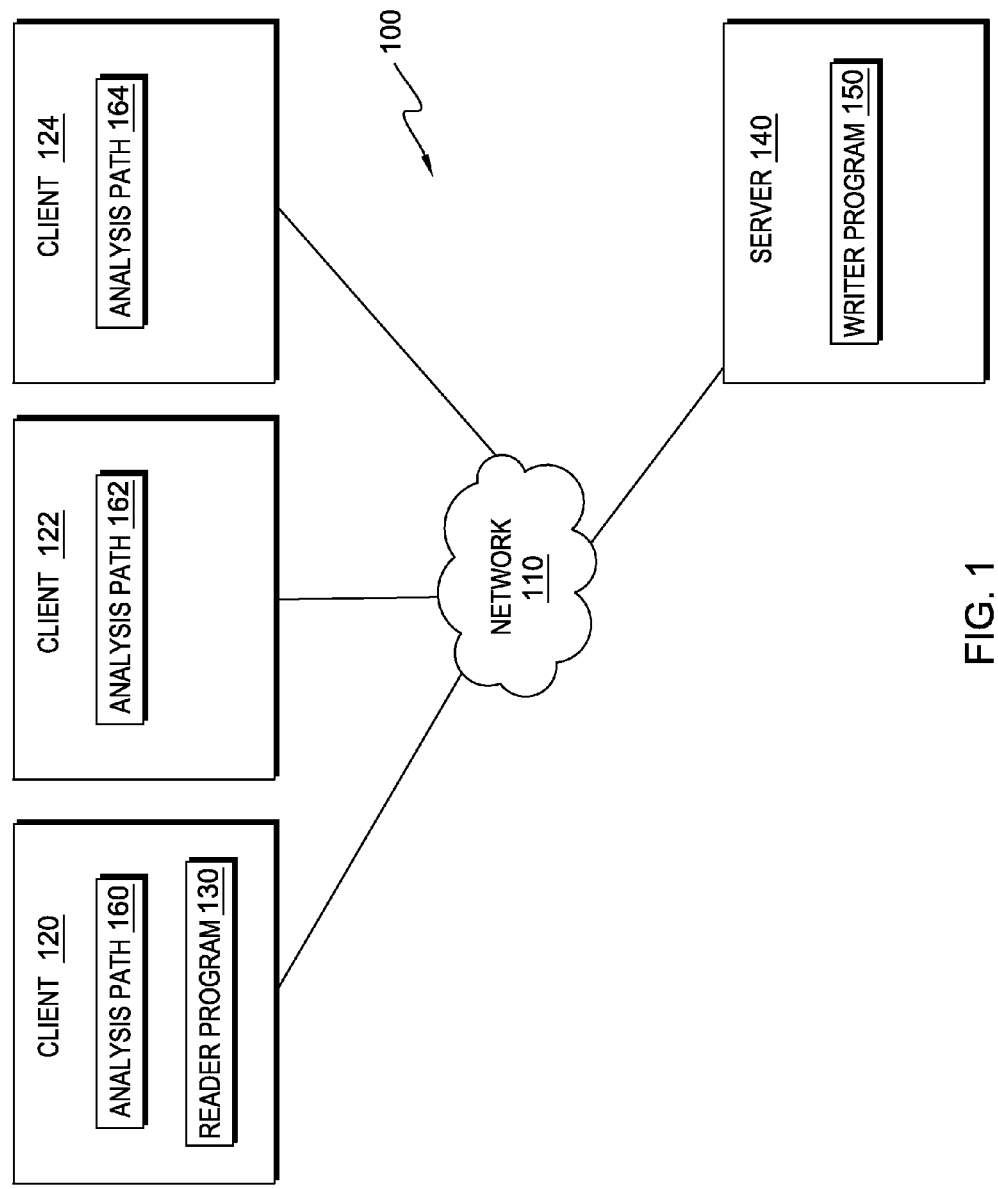
FIG. 1 is a functional block diagram illustrating a distributed data processing environment, in accordance with one embodiment of the present invention.

The present invention will now be described with reference to the Figures. FIG. 1 is a functional block diagram illustrating a distributed data processing environment, generally designated 100, in accordance with one embodiment of the present invention. Data processing environment 100 includes client 120, client 122, client 124, and server 140 interconnected over network 110. Network 110 may be a local area network (LAN), a wide area network (WAN) such as the Internet, any combination thereof, or any combination of connections and protocols that will support communications between server 140 and clients 120, 122, and 124, in accordance with embodiments of the invention. Network 110 may include connections such as wired, wireless, communication links, or fiber optic cables. Data processing environment 100 may include additional servers, clients, and other devices not illustrated.

Server 140 may be a management server, a web server, or any other electronic device or computing system capable of processing program instructions and receiving and sending data. In some embodiments, server 140 may be a laptop computer, tablet computer, personal computer, desktop computer, or any programmable electronic device capable of communicating with clients 120, 122, and 124 via network 110. In other embodiments server 140 may represent a server computing system utilizing multiple computers to act as a single pool of seamless resources when accessed over network 110, as is common in a cloud computing environment. Writer program 150 is located on server 140. Server 140 may include additional components, programs, or devices not shown. Server 140 may include components as depicted and described in further detail with respect to FIG. 4.

Clients 120, 122, and 124 may be, for example, personal computers, desktop computers, laptop computers, netbook computers, tablet computers, personal digital assistants (PDAs), smart phones, or other computation and/or communication devices. Clients 120, 122, and 124 may be any combination of different computation and/or communication devices. In general, clients 120, 122, and 124 may be any electronic device or computing device capable of processing program instructions, sending and receiving data information and communicating with server 140 via network 110. In other embodiments, data processing environment 100 may contain any number and combination of client devices not shown. Client 120 contains reader program 130 and analysis path 160. Client 122 contains analysis path 162. Client 124 contains analysis path 164. In other embodiments not shown, multiple clients may contain reader program 130. Clients 120, 122, and 124 may include components, as depicted and described in further detail with respect to FIG. 4.

Analysis paths, such as analysis path 160, 162, and 164, represent a search history, information resource access pattern, analysis or information history, path, or logic that a user follows while analyzing one or more data resources. For example, a user may be trying to determine why automobile sales are down from previous years. The user may begin by comparing car sales season to season. The user may see that sales are lowest in the summer and look to see which model in the summer is sold the least. The user compares this year's summer sales to previous summer sales and identifies that Brand X's sales have decreased significantly. The user researches Brand X and sees that Brand X recently recalled several vehicle models. The user concludes that the recall is one explanation for why sales are down. The graphs, charts, and design specifications that the user generated or analyzed in doing research, and the ultimate conclusion reached are stored chronologically on clients, such as clients 120, 122, and 124 as analysis paths.

Analysis paths (e.g., analysis paths 160, 162, and 164), may be created by reader program 130. In some embodiments, reader program 130 provides a method of preserving the data resources a user encounters as the user navigates through an information space. In some embodiments, reader program 130 stores a data resource's uniform resource identifier (URI) as a user navigates through an information space. Reader program 130 repeats this process for multiple iterations until a user concludes their navigation, storing each URI as a point along an analysis path (e.g., analysis path 160, 162, or 164). In other embodiments, a separate program or system (not shown) may create the analysis path(s) as long as writer program 150 is able to receive these analysis path(s) via network 110.

The points along an analysis path represent the various data resources a user encounters as the user navigates through an information space. These points include data and metadata sufficient to recreate, re-identify, or retrieve the point for every user with access to the analysis path. In one embodiment, the data and metadata identify an address or location (e.g., a URI) of a data resource and one or more variables or representation details of the data resource. In this case, the data and metadata are sufficient to recreate or retrieve the point because the data and metadata identify a particular view of a particular data resource that corresponds to the point. In one embodiment, a user may encounter points A, C, D, and E. Point A may be a database query as well as representation details to present the returned data as a bar graph. In such an example, the database query is the metadata about point A and the representation details are data about point A. The metadata and data about point A are sufficient to recreate, re-identify, or retrieve the point for every user visiting point A when traversing the analysis path.

In the embodiment of FIG. 1, server 140 includes writer program 150. Writer program 150 receives analysis path information 160, 162, and 164 from clients 120, 122, and 124 via network 110. Writer program 150 compares analysis path information 160, 162, and 164 in order to merge the analysis paths into a single merged analysis path (e.g., merged analysis path 330, which is shown in FIG. 3). Writer program 150 merges the information in analysis paths 160, 162, and 164 to organize the information and helps users to better visualize the data and data navigation paths, analyze the logic used during navigation, and receive insight from the analysts and research process. In some embodiments, writer program 150 can send the merged analysis paths to reader program 130 via network 110. Reader program 130 allows users to view and use this merged analysis path. The operations of writer program 150 are described in further detail in FIG. 2.

In FIG. 1, reader program 130 is located on client 120. Reader program 130 may be a dedicated client reader program, a function integrated within another program or any other program or function that can communicate with writer program 150 and provide a user interface for viewing information and, in some embodiments, inputting analysis information. Reader program 130 allows users to view the merged analysis paths created by writer program 150. In other embodiments, functions of reader program 130 may be performed by writer program 150 and functions of writer program 150 may be performed by reader program 130. In other embodiments still, a client may have both reading and writing capabilities. FIG. 1 is intended as an illustrative example and not as architecturally limiting.

Figure 2:
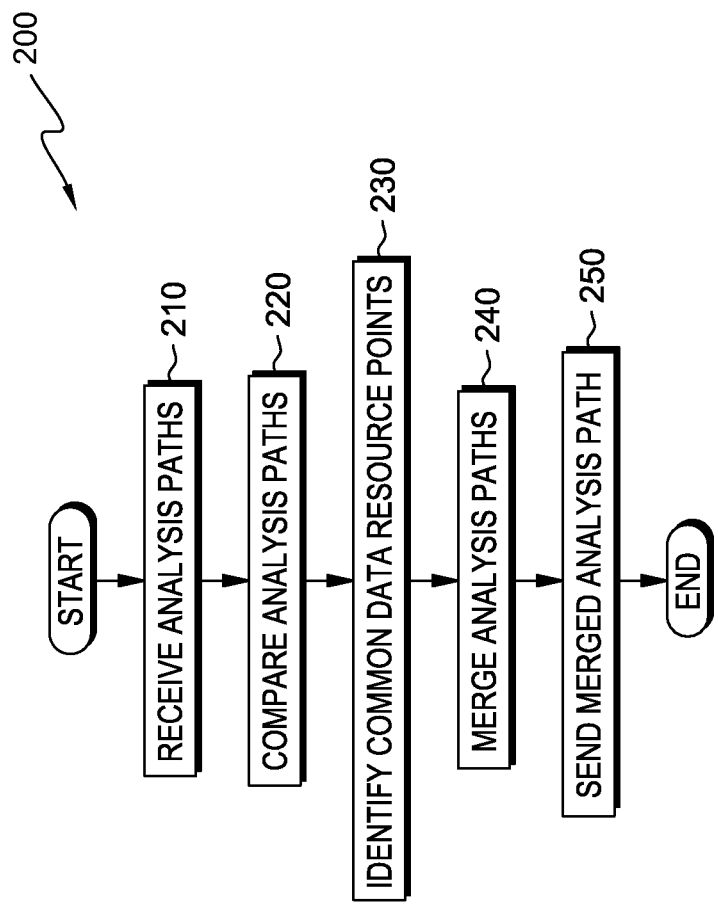
FIG. 2 is a flowchart depicting operational steps of a writer program executing within the data processing environment of FIG. 1, for merging data resources along a navigation path through an information space, in accordance with one embodiment of the present invention.
Figure 3:
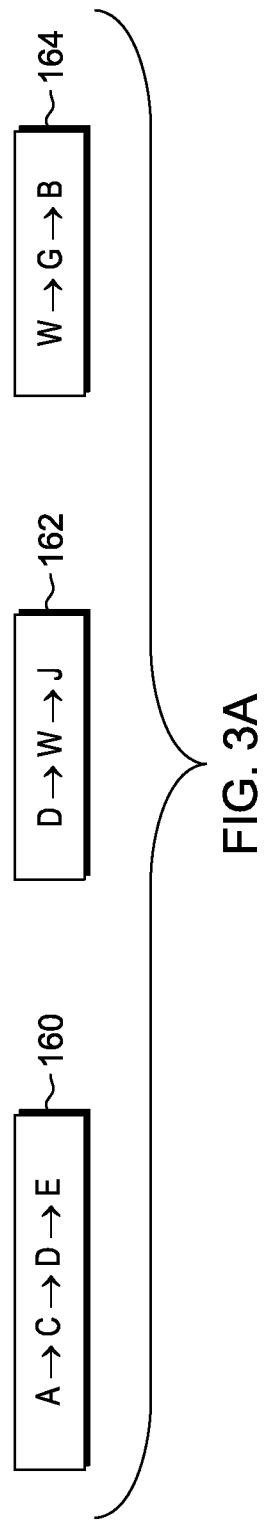
FIGS. 3A and 3B are illustrations of exemplary analysis paths, in accordance with one embodiment of the present invention.

FIG. 2 is a flowchart depicting operational steps 200 of writer program 150 executing within data processing environment 100 of FIG. 1, in accordance with an embodiment of the present invention. Writer program 150 operates to receive analysis paths 160, 162, and 164, merge the analysis information contained in analysis paths 160, 162, and 164; and send the merged analysis information to reader program 130 via network 110.

In step 210 writer program 150 receives two analysis paths (e.g., analysis path 160, 162, or 164) from clients (e.g., client 120, 122, or 124). In other embodiments, writer program 150 may receive multiple analysis paths from any number of clients. Analysis paths represent the logic, path, or other steps that a user of a client took during research. Each new data resource, or a combination of data resources (e.g., a graph, design specification, web browser query), can be represented by a point along the analysis path. For example, a first user, operating client 120, may analyze a graph A, then a chart B, then a spreadsheet C, and then a graph D while researching a specific topic to generate a first analysis path. A second user, operating client 122, may analyze graph A, then spreadsheet E, then chart F, then chart G to generate a second analysis path. The first and second users transmit analysis paths 160 and 162, respectively, to server 140 via network 110. Server 140 receives the transmitted analysis paths from their respective clients.

In step 220 writer program 150 compares the data resource points along the two received analysis paths. In some embodiments, writer program 150 will compare the data resources themselves. For example, writer program 150 will compare the analysis paths to determine if the two analysis paths contain any matching data resource points. In other embodiments, writer program 150 will compare the metadata of each data resource point along the two received analysis paths. For example, writer program 150 will compare the two analysis paths to determine if the metadata of any data resource points match (e.g., both analysis paths refer to information about car recalls in May of 2012).

In step 230 writer program 150 will identify common data resource points along the two analysis paths. In some embodiments, writer program 150 identifies common data resource points along the two analysis paths by comparing the data and metadata sufficient to recreate, re-identify, or retrieve the data resource of various data resources. In some embodiments, writer program 150 anchors one data resource's data and metadata and compares it to the data and metadata sufficient to recreate, re-identify, or retrieve the data resource of other data resources. Writer program 150 repeats this anchoring process for multiple iterations until every data resource point has been compared to every other data resource point in the two analysis paths.

In step 240 writer program 150 merges the analysis paths at the common point or common points. In some embodiments, writer program 150 will merge analysis paths at the first common point. In other embodiments, writer program 150 will merge analysis paths at the last common point. In other embodiments, writer program 150 will merge analysis paths at all common points. A user of writer program 150 may be able to customize or otherwise determine where writer program 150 merges the plurality of analysis paths. In some embodiments, this merging will occur when the points are the same data resource (e.g., the same graph or same chart). In other embodiments, this will occur when the metadata is the same (e.g., a chart and a web page about the same thing). Writer program 150 merges the analysis paths to create a merged analysis path.

The merging creates a merged analysis path that is separate from the initial two analysis paths. Writer program 150 creates a new analysis path that is similar to the two separate analysis paths as it illustrates the logic, paths, or steps that at least two users of a client took during research. Writer program 150 creates a new analysis path with at least two branches to represent the different paths the analysis paths took. Writer program 150 will create separate branches to illustrate unique data resource value elements and connect the branches to show common data resource value elements between the two analysis paths. The merging and creation of a merged analysis path is illustrated in FIGS. 3A and 3B.

Data resources for points along an analysis path may be structured data (e.g., spreadsheets, databases, etc.) or unstructured data (e.g., images, videos, and web documents). In some embodiments, a point contains the data resource itself (e.g., the structured data or the unstructured data). In other embodiments, a point contains a reference to the data resource (e.g., a URI or a uniform resource locator). A point referencing may include any data or metadata provided the point has enough information to recreate, re-identify, or retrieve the referenced data resource. Analysis paths may contain points referencing structured or unstructured data.

In some embodiments, unstructured data resources can be merged using a matching algorithm employing Unstructured Information Management Architecture (UIMA). UIMA is component software architecture to extract entity-relation, as well as other information, that is used to determine whether the unstructured data resources match and should be merged.

In step 250 writer program 150 sends this merged analysis path to reader program 130 via network 110. In some embodiments, writer program 150 may send this merged analysis path to multiple reader programs (e.g., reader program 130). Writer program 150 may send this merged analysis path as an email, text message, or web document provided client 120 is able to receive the resource and reader program 130 is able to display the resource to a user.

FIG. 3A is an exemplary illustration of analysis paths 160, 162, and 164. Analysis path 160 follows a path going from points A to C to D to E. The various points of the illustrated analysis paths may be any number of data resources. For example, each point may be a graph, website, web document, book, video, or any other data resource. In some embodiments, the points A, C, D, and E may represent the metadata of the data resources. In other embodiments, the points A, C, D, and E may represent the uniform resource indicator/locator (URI/URL) associated with the data resources. In a similar way, analysis path 162 follows a path going from points D to W to J and analysis path 164 follows a path going from points W to G to B.

FIG. 3B illustrates merged analysis path 330. Merged analysis path 330 was generated following processing under writer program 150 and the steps illustrated in FIG. 2. Merged analysis path 330 has three analysis branches representing the three analysis paths 160, 162, and 164: one branch from points A to C to D to E, a second branch from points A to C to D to W to J, and a third branch from points A to C to D to W to G to B. Points D and W are the points along merged analysis path 330 where at least two branches connect. A connection occurs at point D because both analysis path 160 and 162 contain point D. In a first branch, D connects to point E because analysis path 160 moved from point D to point E. In a second branch, D connects to point W because analysis path 162 moved from point D to W. In a similar way, a connection occurs at point W because both analysis path 162 and 164 contain point W. W connects to point J, continuing the second branch because analysis path 162 moves from W to J. W connects to point G, creating a third branch, because analysis path 164 moves from W to G.

Figure 4:
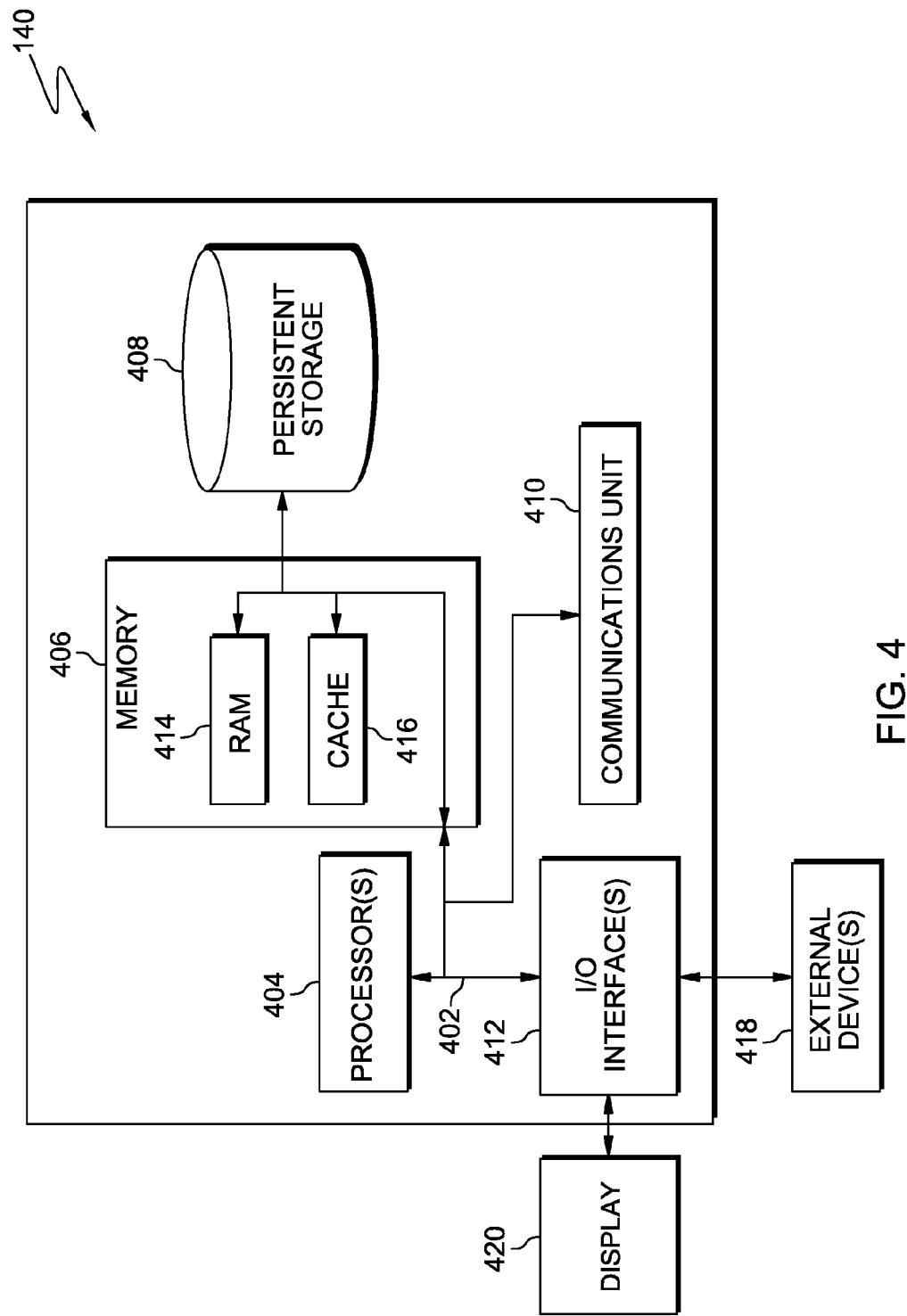
FIG. 4 is a block diagram of components of the server and client of FIG. 1, in accordance with one embodiment of the present invention.

FIG. 4 is a block diagram of components of the computing device executing operations for analysis path merging, in accordance with an embodiment of the present disclosure. For example, FIG. 4 is a block diagram of server 140 within data processing environment 100 executing operations of writer program 150.

It should be appreciated that FIG. 4 provides only an illustration of one implementation and does not imply any limitations with regard to the environments in which different embodiments may be implemented. Many modifications to the depicted environment may be made. For example, FIG. 4 may depict components of clients 120, 122, and/or 124.

Server 140 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Each of writer program 150 and reader program 130 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 110. In these examples, communications unit 410 includes one or more network interface cards. Communications unit 410 may provide communications through the use of either or both physical and wireless communications links. Each of reader program 130 and writer program 150 may be downloaded to persistent storage 408 through communications unit 410.

I/O interface(s) 412 allows for input and output of data with other devices that may be connected to server 140. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention (e.g., reader program 130 and writer program 150) can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for merging analysis paths, the method comprising:
   identifying, by one or more processors, a first analysis path and a second analysis path, wherein each analysis path identifies one or more data resources of an information space, wherein the first analysis path defines a first chronological order in which the one or more data resources of the information space identified by the first analysis path have been accessed by a user and the second analysis path defines a second chronological order in which the one or more data resources of the information space identified by the second analysis path have been accessed by a user;
   determining, by one or more processors, that a first data resource of the one or more data resources identified by the first analysis path matches a second data resource of the one or more data resources identified by the second analysis path;
   determining, by one or more processors, that a third data resource of the one or more data resources identified by the first analysis path matches a fourth data resource of the one or more data resources identified by the second analysis path;
   determining, by one or more processors, that the third data resource of the one or more data resources identified by the first analysis path is accessed later in the first chronological order than the first data resource of the one or more data resources identified by the first analysis path; and
   generating, by one of more processors, a third analysis path in response to the determination that the third data resource of the one or more data resources identified by the first analysis path matches the fourth data resource of the one or more data resources identified by the second analysis path and the determination that the third data resource of the one or more data resources identified by the first analysis path is accessed later in the first chronological order than the first data resource of the one or more data resources identified by the first analysis path, the third analysis path identifying a combination of the one or more data resources identified by the first analysis path and the one or more data resources identified by the second analysis path,
   wherein the third analysis path defines a third chronological order that comprises a merger of the first chronological order and the second chronological order together only at the third and fourth data resources based on the determination that the third data source of the one or more data resources identified by the first analysis path is accessed later in the first chronological order than the first data source of the one or more data resources identified by the first analysis path, the third chronological order preserving the first chronological order, as defined by the first analysis path, in which the one or more data resources identified by the first analysis path have been accessed, the third chronological order preserving the second chronological order, as defined by the second analysis path, in which the one or more data resources identified by the second analysis path have been accessed.

2. The method of claim 1, wherein the first analysis path identifies at least one of a search history or access pattern of a first user and the second analysis path identifies at least one of a search history or access pattern of a second user.

3. The method of claim 2, wherein the third analysis path identifies one or more data resources of the information space, and wherein the one or more data resources of the third analysis path include a fifth data resource that matches both the third data resource and the fourth data resource.

4. The method of claim 2, wherein determining that the first data resource matches the second data resource is based, at least in part, on at least one of the search history and the access pattern of each analysis path.

5. The method of claim 1, wherein each analysis path includes a metadata for each data resource of the one or more data resources that identifies at least a uniform resource locator of the data resource.

6. The method of claim 5, wherein determining that the first data resource matches the second data resource is responsive to determining that the metadata of the first data resource matches the metadata of the second data resource.

7. The method of claim 1, wherein the information space is the World Wide Web.

8. The method of claim 1, further comprising presenting the third analysis path to a user.

9. The method of claim 2, wherein determining that the third data resource matches the fourth data resource is based, at least in part, on at least one of the search history and the access pattern of each analysis path.

10. The method of claim 5, wherein determining that the third data resource matches the fourth data resource is responsive to determining that the metadata of the third data resource matches the metadata of the fourth data resource.

\* \* \* \* \*